United States Patent Office 3,417,163
Patented Dec. 17, 1968

3,417,163
PROCESS FOR THE MANUFACTURE OF COPOLYMERS OF β-LACTAMS
Claus Beermann, Neu-Isenburg, Erwin Schmidt, Frankfurt am Main, and Walter Rupp, Niederhofheim, Taunus, Germany, assignors to Farbwerke Hoechst Aktiengesellschaft vormals Meister Lucius & Bruning, Frankfurt am Main, Germany, a corporation of Germany
No Drawing. Filed Jan. 6, 1966, Ser. No. 518,998
Claims priority, application Germany, Jan. 7, 1965, F 44,891
7 Claims. (Cl. 260—857)

ABSTRACT OF THE DISCLOSURE

A process for making block copolymers of beta-lactams is disclosed. The beta-lactams used have a hydrogen atom at the nitrogen atom thereof and from 0 to 4 substituents on the alpha and/or beta carbon atoms thereof. The substituents may contain a total of up to 12 aliphatically bound carbon atoms or an aromatic radical and up to 9 aliphatically bound carbon atoms. The substituent carbon chains may be arranged in a ring including the alpha and beta carbon atoms.

Polymerization may be effected at a temperature of −15° to 120° C. by anionic polymerization in a polymerization reaction mixture containing a basic catalyst. It has been found that by feeding 2 or more such beta-lactams alternately to the polymerization mixture, the desired block polymers are formed. The lactams may be fed alternately to a solution or dispersion of the basic catalyst in an inert solvent, or to a solution of the basic catalyst which is emulsified in a second solvent with which it is miscible to only a limited extent or to a dispersion of the basic catalyst which is emulsified in a solvent with which the dispersion is miscible to only a limited extent. The beta-lactam mixture to be polymerized may be miscible with either solvent.

---

The present invention relates to a process for the manufacture of copolymers of β-lactams.

In the anionic polymerization of lactams, an alkaline catalyst and, if desired, a chain starting agent are added to the lactam according to known methods. At a determined temperature which depends on the monomers used as starting materials, polymerization sets in and proceeds until a determined extent of conversion at which the reaction subsides has been reached. According to the same principle, β-lactams are generally polymerized in a homogeneous phase or in dispersion. The process is generally carried out with the addition of a solvent in which the lactam is soluble and which swells or dissolves the polymer formed. It is, however, often difficult in that process to control the polymerization which takes place with liberation of heat. Particularly the molecular weight distribution can be influenced only with difficulty.

Starting from several β-lactams, it is not possible in the known processes to obtain arbitrarily either only copolymers with statistical monomer distribution or only block copolymers. The nature of the copolymers hitherto obtained was determined only by the properties, particularly the speed of polymerization, of the monomers used as starting substances. Monomers whose speeds of polymerization were very similar yielded copolymers with statistical distribution of the monomer units while in the case of monomers with very different speeds of polymerization the more reactive component polymerized substantially with itself whereby non-uniform copolymers having predominantly the characteristics of block polymers or polymer mixtures were obtained.

Now we have found that the above disadvantages can be avoided and copolymers of β-lactams in which the monomer units are arranged in the chain molecules in alternating blocks can be obtained regardless of the properties of the monomers by adding at least two β-lactams alternately to the solution or dispersion of a basic catalyst in an inert solvent.

According to the process of the invention there may be polymerized β-lactams which are unsubstituted at the nitrogen atoms and carry in the α- and/or β-positions to the carbonyl group up to 4 substituents containing a total of at most 12 aliphatically bound carbon atoms or an aromatic radical and at most 9 aliphatically bound carbon atoms. The substituents may alternatively be members of a common ring.

Compounds which can be polymerized according to the process of the invention are, for example, azetidinone, 4-methyl-azetidinone, 4-isopropyl-azetidinone, 4-vinyl-azetidinone, 4-phenyl-azetidinone, 4-methyl-4-phenoxymethyl-azetidinone, 4-chlorophenyl-azetidinone, 3,3-dimethyl-azetidinone, 3,4-dimethyl-azetidinone, 4,4-dimethyl-azetidinone, 4-methyl-4-neopentyl-azetidinone, 3,3,4,4-tetramethyl - azetidinone, 4-(4′-isopropylcyclohexyl)-azetidinone or polycyclic lactams having the constitutions

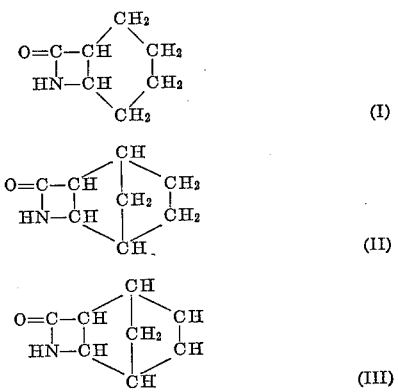

The process of the invention may also be used for copolymerizing β-lactams with up to 50% of higher lactams such, for example, as α-pyrrolidone.

The polymerization is carried out according to the anionic mechanism. The polymerization is catalyzed in known manner by the addition of alkaline compounds producing lactam anions in the polymerization mixture. Suitable catalysts are, for example, the alkali metal compounds of β-lactams, the potassium salt of pyrrolidone, the sodium salt of ε-caprolactam, phenyl sodium, lithium hydride and other catalysts generally used in the anionic polymerization of lactams.

As chain starting agents, N-acyl- or N-sulfonyl compounds of lactams may be used in usual manner. The chain starting agents may also be produced by adding acylating or sulfonating reagents to the polymerization mixture.

The anionic polymerization is generally carried out at a temperature within the range of −15° to +120° C.

The process of the invention enables the degree of polymerization and the molecular weight distribution to be modified to a considerably higher degree than in the known processes. A different molecular weight distribution can be obtained, for example, by placing, in one instance, an acyl-lactam serving as chain starting agent in the reaction vessel together with the catalyst solution before starting the reaction or by adding the said acyl-lactam, in another instance, dropwise together with the monomers. The last mentioned method enables products of a particularly broad molecular weight distribution to be obtained. When a chain starting agent and a determined amount of a chain terminator, for example water, are added dropwise simultaneously with the lactams, products having a narrower molecular weight distribution are obtained. The properties of the polymers can also be modified by varying the speed of dropping-in or the amount of catalyst. The speed of dropping-in is advantageously adjusted such that no relatively large amounts of the monomer being added accumulate in the reaction vessel.

According to the process of the invention it is, for example, possible to produce copolymers in which crystalline zones alternate in any desired proportion with amorphous zones, or zones that can be cross-linked with zones that cannot be cross-linked.

The polymerization process of the invention can be carried out in inert organic solvents. It is advantageous to use solvents which swell or dissolve the polymer which forms. Examples of such solvents are dimethyl sulfoxide, tetramethylene sulfone, phosphoric acid-tris-dimethylamide, dimethyl formamide and methyl pyrrolidone. In these solvents the highest degrees of polymerization are obtained.

Since the reaction mixture becomes more and more viscous towards the end of the dropping-in and may finally solidify to form a gel, considerable mechanical expenditure is required in order to uniformly distribute the monomers in the reaction mixture. To avoid these and other difficulties arising in the polymerization, the catalyst solution is advantageously emulsified in a solvent with which it is immiscible. As outer phase, solvents may, for example, be used, which are substantially immiscible or only incompletely miscible with the lactams and the solvent of the catalyst solution. Since a dynamical equilibrium exists between the droplets of an emulsion, the lactam which has been added dropwise gradually intersperses in a dispersed form the whole inner phase and is thus finally completely polymerized.

Since this distributing process may proceed too slowly, in special cases, particularly in the case of β-lactams that polymerize rather rapidly, droplets in which polymerization occurs may be depleted of monomers so that strongly non-uniform products may be obtained, depending on the speed of stirring and the size of droplets. Finally, after a determined extent of conversion has been reached, the exchange of material in the droplets of a polymerization emulsion may stop altogether (cf. Houben-Weyl, Methoden der Organ. Chemie, 4th edition, volume 14/1, page 409).

It is therefore particularly advantageous to use as outer phase solvents that are incompletely miscible with the catalyst solution and completely miscible with the lactams or lactam mixtures to be polymerized. The lactam which has been dropped in diffuses in this case in the form of a molecular dispersion through the outer phase into the droplets of the catalyst solution so that the solution equilibrium is very rapidly attained. In this manner, particularly high viscosity values can, for example, be obtained.

As solvents for the catalyst solution which generally constitutes the inner phase, it is particularly advantageous to use dimethyl sulfoxide and tetramethylene sulfone. These compounds are incompletely miscible with all the solvents of the outer phase to be used in accordance with the invention. If aliphatic hydrocarbons are used as the outer phase, dimethyl formamide and methyl pyrrolidone may also be used for the catalyst solution.

As solvents for the outer phase which are immiscible with the β-lactams mentioned below and with the solvent of the catalyst solution, aliphatic or cycloaliphatic hydrocarbons with 5 to 24 carbon atoms may be used.

As solvents of the outer phase which are completely miscible with most β-lactams or their mixtures, but only to a certain extent miscible with the solvents of the catalyst solution, there may, for example, be used (1) aliphatic ethers with 1 to 3 ether oxygen atoms and 4 to 24 carbon atoms in the molecule;
(2) araliphatic ethers with 1 to 3 ether oxygen atoms, 6 to 24 aliphatically bound carbon atoms and 1 to 3 phenyl rings in the molecule;
(3) araliphatic hydrocarbons with 1 to 3 phenyl rings and 3 to 24 aliphatically bound carbon atoms in the molecule.

It is also possible to use mixtures of the above solvents.

To obtain as fine an emulsion as possible which is particularly favourable for the polymerization, it is advantageous to add emulsifying agents, for example, emulsifiers, protective colloids or thickeners, to the polymerization mixtures.

The following examples serve to illustrate the invention but they are not intended to limit it thereto.

EXAMPLE 1

A solution of 10 g. of 4-phenyl-azetidinone in 40 cc. of tetramethylene sulfone and a solution of 30 g. of 4,4-dimethyl-azetidinone in 20 cc. of tetramethylene sulfone were alternately dropped, each in 6 portions, at 30° C., while stirring vigorously, into a solution of 0.6 cc. of 4,4-dimethyl-azetidinone, 0.3 g. of the potassium salt of pyrrolidone, 0.02 g. of oxalyl-pyrrolidone and 200 cc. of tetramethylene sulfone. The total time of dropping-in was 2 hours. The reaction mixture which became more and more viscous finally gelatinized. The gel so obtained was triturated with water and dried at 100° C. 32 g. of copolymer were obtained. The product had a relative viscosity of 9.2, determined on a solution of 1 g. of substance in 100 cc. of concentrated sulfuric acid at 20° C.

EXAMPLE 2

A solution of 0.6 cc. of 4,4-dimethyl-azetidinone and 0.3 g. of the potassium salt of pyrrolidone in 70 cc. of dimethyl sulfoxide was emulsified in 100 cc. of isopropyl ether to which 0.5% of the dimethyl sulfamide of an ethylene-propylene copolymer of the following formula

$$[C_{27}H_{55}SO_2N(CH_3)_2Cl_{1.4}]_n$$

had been added. To the emulsion so obtained a solution of 15 g. of 4-vinyl-azetidinone and 15 mg. of oxalyl-pyrrolidone in 15 cc. of isopropyl ether and a solution of 15 g. of 4-methyl-azetidinone and 15 mg. of oxalyl-pyrrolidone in 15 cc. of isopropyl ether were alternately added, each in three portions of 10 cc., at 20° C., within 1 hour, while stirring vigorously, from two dropping funnels. By boiling the reaction product in water there were obtained 30 g. of polymer having a relative viscosity of 13.3, determined on a solution of 1 g. of substance in 100 cc. of concentrated sulfuric acid at 20° C. The product formed a strongly opalescent solution in formic acid of 98% strength.

When the two lactam solutions were not added alternately but when they were mixed with one another before being dropped-in, a statistical copolymer in which the monomers were not contained in the form of alternating blocks and which yielded a clear solution in formic acid, was obtained.

The same results were obtained when, instead of isopropyl ether, dodecylbenzene was used as solvent.

EXAMPLE 3

A solution of 0.4 cc. of 4,4-dimethyl-azetidinone and 0.2 g. of the potassium salt of pyrrolidone in 60 cc. of dimethyl sulfoxide was emulsified in 70 cc. of isopropyl ether containing 0.5% of an emulsifying agent of the type indicated in Example 2. To the emulsion so obtained a solution of 10 g. of 4-methylazetidinone, 5 g. of 4-phenoxymethyl-4-methyl-azetidinone and 8 mg. of oxalyl-pyrrolidone in 15 cc. of isopropyl ether and a solution of 10 g. of 4-vinyl-azetidinone and 5 mg. of oxalyl-pyrrolidone in 10 cc. of isopropyl ether were alternately added each in six portions, at 20° C., within 2 hours, while stirring vigorously, from two dropping funnels. By boiling the fine-grained product with water, 22 g. of polymer were obtained. The polymer had a relative viscosity of 19.6 determined on a solution of 1 g. of substance in 100 cc. of concentrated sulfuric acid at 20° C.

The crystal lattice of the vinyl-azetidinone homopolymer was still traceable in the copolymer. Corresponding to the method of preparation, the other two monomer components were polymerized in statistical mixture. The crystal lattice of their homopolymers was not traceable. The product contained a considerable amount of amorphous zones, which corresponded to the behaviour of a statistical copolymer of 4-phenoxy-methyl-4-methyl-azetidinone and 4-methyl-azetidinone.

When, however, the three monomers were alternately added in corresponding portions from three dropping funnels, a polymer was obtained which contained homopolymer blocks of each lactam.

EXAMPLE 4

A solution of 3 g. of the potassium salt of pyrrolidone and 6 cc. of 4,4-dimethyl-azetidinone in 600 cc. of dimethyl sulfoxide was emulsified in 900 cc. of heavy gasoline containing 0.5% of an emulsifying agent of the type described in Example 2 and 0.05% of polyisobutylene. To the emulsion so obtained 150 g. of 3,4-dimethyl-azetidinone and 150 g. of 4,4-dimethyl-azetidinone were alternately added in portions of 15 cc., at 20° C., within 4 hours, while stirring vigorously, from two dropping funnels. The fine-grained product so obtained was suction-filtered after a further two hours, freed from adhering solvent by boiling with water and dried at 100° C.

270 g. of a copolymer having substantially the characteristics of a block polymer were obtained.

What is claimed is:

1. A process for making copolymers of beta-lactams in which the monomer units are arranged in blocks in the polymer chain, said beta-lactams carrying a hydrogen atom at the nitrogen atom and having from zero to 4 substituents on the alpha and beta carbon atoms thereof containing up to 15 carbon atoms which may comprise a ring including said alpha and beta carbon atoms, the polymerization being effected at a temperature of −15° to 120° C. by anionic polymerization in a polymerization reaction mixture comprising an inert solvent solution of a basic catalyst emulsified in a different second solvent with which said catalyst solution is miscible to only a limited extent, the monomer feed to said reaction mixture being two or more of said beta-lactams fed alternately to said reaction mixture to produce said block copolymer, each alternate portion of beta-lactam fed being caused to react substantially before the next alternate portion is added to the reaction mixture.

2. A process for making copolymers of beta-lactams in which the monomer units are arranged in blocks in the polymer chain, said beta-lactams carrying a hydrogen atom at the nitrogen atom and having from zero to 4 substituents on the alpha and beta carbon atoms thereof containing up to 15 carbon atoms which may comprise a ring including said alpha and beta carbon atoms, the polymerization being effected at a temperature of −15° to 120° C. by anionic polymerization in a polymerization reaction mixture comprising a dispersion of a basic catalyst in an inert solvent, said dispersion being emulsified in a different second solvent with which it is miscible to only a limited extent, the monomer feed to said reaction mixture being two or more of said beta-lactams fed alternately to said reaction mixture to produce said block copolymer, each alternate portion of beta-lactam fed being caused to react substantially before the next alternate portion is added to the reaction mixture.

3. A process for making copolymers of beta-lactams in which the monomer units are arranged in blocks in the polymer chain, said beta-lactams carrying a hydrogen atom at the nitrogen atom and having from zero to 4 substituents on the alpha and beta carbon atoms thereof containing up to 15 carbon atoms which may comprise a ring including said alpha and beta carbon atoms, the polymerization being effected at a temperature of −15° to 120° C. by anionic polymerization in a polymerization reaction mixture comprising an inert solvent solution of a basic catalyst, said solution being emulsified in a different second solvent with which it is miscible to only a limited extent, said different second solvent being completely miscible with the beta-lactam mixture to be polymerized, the monomer feed to said reaction mixture being two or more of said beta-lactams fed alternately to said reaction mixture to produce said block copolymer, each alternate portion of beta-lactam fed being caused to react substantially before the next alternate portion is added to the reaction mixture.

4. A process for making copolymers of beta-lactams in which the monomer units are arranged in blocks in the polymer chain, said beta-lactams carrying a hydrogen atom at the nitrogen atom and having from zero to 4 substituents on the alpha and beta carbon atoms thereof containing up to 15 carbon atoms which may comprise a ring including said alpha and beta carbon atoms, the polymerization being effected at a temperature of −15° to 120° C. by anionic polymerization in a polymerization reaction mixture comprising a dispersion of a basic catalyst in an inert solvent, said dispersion being emulsified in a different second solvent with which it is miscible to only a limited extent, said different second solvent being completely miscible with the beta-lactam mixture to be polymerized, the monomer feed to said reaction mixture being two or more of said beta-lactams fed alternately to said reaction mixture to produce said block copolymer, each alternate portion of beta-lactam fed being caused to react substantially before the next alternate portion is added to the reaction mixture.

5. A process as claimed in claim 1 wherein the inert solvent of the catalyst is at least one solvent selected from the group consisting of dimethyl sulfoxide and tetramethylene sulfone.

6. A process as claimed in claim 1 wherein the inert solvent of the catalyst is at least one solvent selected from the group consisting of dimethyl formamide and N-methyl pyrrolidone and the second solvent is at least one solvent selected from the group consisting of aliphatic and cycloaliphatic hydrocarbons having 5 to 24 carbon atoms in the molecule.

7. A process as claimed in claim 3 wherein the inert solvent of the catalyst is at least one solvent selected from the group consisting of dimethyl sulfoxide, tetramethylene sulfone, phosphoric acid tris-dimethyl amide, dimethyl formamide and N-methyl pyrrolidone and the second solvent is at least one solvent selected from the group consisting of aliphatic ethers having 1 to 5 ether oxygen atoms and 4 to 24 carbon atoms in the molecule, araliphatic ethers having 1 to 3 ether oxygen atoms, 6 to 24 aliphatically bound carbon atoms and 1 to 3 phenyl rings in the molecule, and araliphatic hydrocarbons with 1 to 3 phenyl rings and 3 to 24 aliphatically bound carbon atoms in the molecule.

References Cited

UNITED STATES PATENTS

| | | | |
|---|---|---|---|
| 3,093,618 | 6/1963 | Graf | 260—78 |
| 3,211,706 | 12/1965 | Borner | 260—78 |
| 3,342,783 | 9/1967 | Schlack | 260—78 |

FOREIGN PATENTS 884,974   12/1961   Great Britain.

MURRAY TILLMAN, *Primary Examiner.*

PAUL LIEBERMAN, *Assistant Examiner.*

U.S. Cl. X.R.

260—78, 30.8, 32.6, 32.4, 33.2, 33.6